(12) United States Patent
Zhong

(10) Patent No.: US 11,090,857 B1
(45) Date of Patent: Aug. 17, 2021

(54) SCREEN PROTECTOR FILM PASTE TOOL

(71) Applicant: Shenzhen walkas Technology Co., Ltd, Shenzhen (CN)

(72) Inventor: Qiuhua Zhong, Guangdong (CN)

(73) Assignee: Shenzhen walkas Technology Co., Ltd

( * ) Notice: Subject to any disclaimer, the term of this patent is extended or adjusted under 35 U.S.C. 154(b) by 0 days.

(21) Appl. No.: 17/169,577

(22) Filed: Feb. 8, 2021

(30) Foreign Application Priority Data

Jun. 2, 2020 (CN) .......................... 202020989000.X

(51) Int. Cl.
| | | |
|---|---|---|
| *B29C 63/02* | (2006.01) | |
| *B29C 63/00* | (2006.01) | |
| *B32B 37/00* | (2006.01) | |
| *B32B 37/16* | (2006.01) | |
| *B29L 31/34* | (2006.01) | |
| *B32B 37/12* | (2006.01) | |
| *B29C 65/00* | (2006.01) | |

(52) U.S. Cl.
CPC .......... *B29C 63/02* (2013.01); *B29C 63/0004* (2013.01); *B32B 37/0046* (2013.01); *B32B 37/16* (2013.01); *B29C 63/0047* (2013.01); *B29C 66/342* (2013.01); *B29C 66/861* (2013.01); *B29C 2063/0008* (2013.01); *B29L 2031/34* (2013.01); *B32B 37/12* (2013.01)

(58) Field of Classification Search
CPC .......... B29C 66/861; B29C 2063/0008; B29C 66/342; B29L 2031/3437; B32B 2307/584
See application file for complete search history.

(56) References Cited

U.S. PATENT DOCUMENTS

| | | | |
|---|---|---|---|
| 2014/0047708 A1* | 2/2014 | Chae ................... | B29C 63/0004 29/700 |
| 2014/0130971 A1* | 5/2014 | Wu ........................ | H05K 13/00 156/249 |
| 2017/0190160 A1* | 7/2017 | Peng ...................... | B32B 37/10 |
| 2020/0094467 A1* | 3/2020 | Cho .................... | B29C 63/0004 |

\* cited by examiner

*Primary Examiner* — Carson Gross
(74) *Attorney, Agent, or Firm* — Andrew C. Cheng

(57) ABSTRACT

The present invention provides a screen protector film paste tool for pasting a film to electronic devices. The screen protector film paste tool includes a frame body, an accommodating space defined by the frame body, and a deformable pressing member provided at least one side of the frame body, the inner side of the deformable pressing member is located in the accommodating space. When the deformable pressing member is pressed down, the inner side of the deformable pressing member moves into the accommodating space and comes into contact with one side of the film to be pasted, and another side of the film to be pasted is in contact with another side of the frame body or the deformable pressing member, so as to fix the film in the accommodating space.

15 Claims, 11 Drawing Sheets

US 11,090,857 B1

SCREEN PROTECTOR FILM PASTE TOOL

TECHNICAL FIELD

The present invention relates to the technical field of electronic device accessory, particularly to a convenient screen protector film paste tool.

BACKGROUND

Currently, smart electronic devices such as mobile phones and tablet computers have become the most important communication tools for people. However, the screens of electronic devices are easily scratched and have scratches when in use, which affects the display effect and the aesthetics of the mobile phone screens, or electronic devices accidently fall and damage the screens. Therefore, people usually apply a transparent plastic or tempered glass film on the screen of the electronic device to protect the mobile phone screen from scratches and falls.

When pasting a film to electronic devices, people tend to align the film with the screen of the electronic device mutually, and tear off the protective layer on the film, to complete the film application. When the film is applied manually, the film and the screen of the electronic device are prone to large alignment errors, and the film effect is poor; moreover, bubbles are prone to occur between the film and the screen of the electronic device, which not only affects the overall aesthetics of the product, but also easily leads to the film to fall off.

To overcome various inconvenience of the existing manual film application, the existing disclosed screen protector film paste tool is adapted to the shape of the mobile phone to be pasted with the film, when placing the screen protector film paste tool on the outside of the mobile phone, the film can be accurately aligned with the mobile phone screen, and then tearing off the protective film at the bottom of the film, to fit the film to the mobile phone screen. The above-mentioned screen protector film paste tool can assist the film to be accurately aligned with the mobile phone to a certain extent, but when tearing off the protective film, the whole film will still be displaced which leads to the deviation of the film and affects the overall aesthetics of the product.

SUMMARY

To overcome problems of the existing manual film application, the present invention provides a screen protector film paste tool convenient for operating and accurately pasting the film.

To solve the technical problem, the present invention provides the following technical solution, a screen protector film paste tool for pasting a film to electronic devices. The screen protector film paste tool includes a frame body, an accommodating space defined by the frame body, and a deformable pressing member provided at least one side of the frame body, the inner side of the deformable pressing member is located in the accommodating space. When the deformable pressing member is pressed down, the inner side of the deformable pressing member moves into the accommodating space and comes into contact with one side of the film to be pasted, and another side of the film to be pasted is in contact with another side of the frame body or the deformable pressing member, so as to fix the film in the accommodating space.

Compared with the prior art, the screen protector film paste tool of the present invention has the following advantages. The present invention provides a screen protector film paste tool for pasting a film to electronic devices. The screen protector film paste tool includes a frame body, an accommodating space defined by the frame body, and a deformable pressing member provided at least one side of the frame body, the inner side of the deformable pressing member is located in the accommodating space. When the deformable pressing member is pressed down, the inner side of the deformable pressing member moves into the accommodating space and comes into contact with one side of the film to be pasted, and another side of the film to be pasted is in contact with another side of the frame body or the deformable pressing member, so as to fix the film in the accommodating space. The screen protector film paste tool can facilitate the user to conveniently, quickly and accurately apply the film on the electronic device to be pasted with the film. By providing the deformable pressing member, the film to be pasted can be fixed in the accommodating space in the screen protector film paste tool by pressing with hands, and by operating with hands to facilitate that the film to be pasted can be precisely fitted to the electronic device to be pasted with the film by one-hand operation after the placement position is fixed.

DETAILED DESCRIPTION

In order to make the objectives, technical solutions, and advantages of the present invention clearer, the present invention is further described in detail below with reference to the accompanying drawings and embodiments. It should be understood that the specific embodiments described herein are only used to explain the present invention and are not used to limit the present invention.

Figure 1:
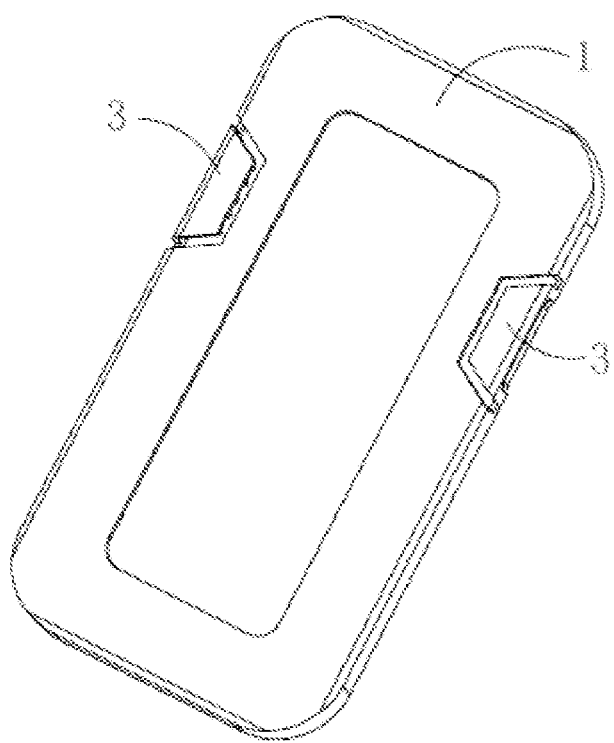
FIG. 1 is a perspective view of a screen protector film paste tool according to a first embodiment of the present invention.

Referring to FIG. 1, a first embodiment of the present invention provides a screen protector film paste tool 100, and the screen protector film paste tool 100 includes a screen protector film paste tool frame body 1. One underside of the frame body 1 is an open structure, another underside of the frame body 1 and four side edges encircle to form an accommodating space 2 for the electronic device and the film; the side frame of the frame body 1 provides at least a deformable pressing member 3, and the inner side of the deformable pressing member 3 is located in the accommodating space 2. When the deformable pressing member 3 is pressed down, the inner side of the deformable pressing member 3 moves a certain distance inward, and when the hand pressing the deformable pressing member 3 is released, the deformable pressing member 3 can reset to the initial position.

Since the distance between the deformable pressing members 3 provided on both sides can be changed based on the pressing force of the user's hand, it is convenient for the user to hold the screen protector film paste tool 100 with one hand and realize the film application.

Figure 2:
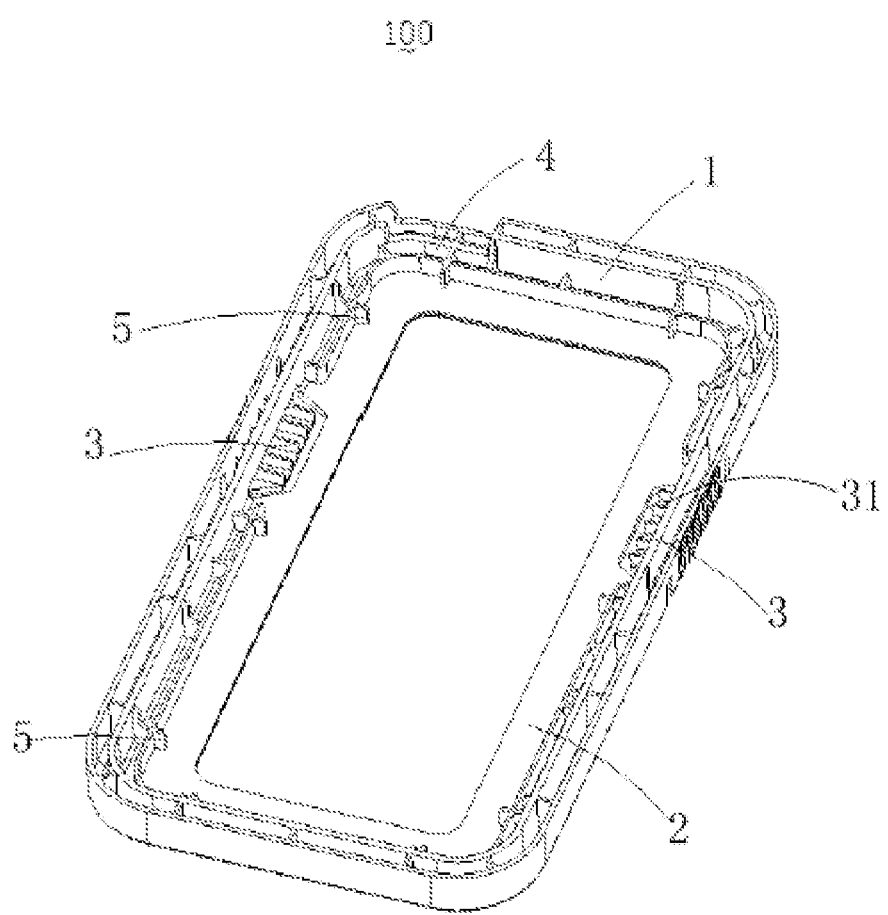
FIG. 2 is a perspective view of the screen protector film paste tool of FIG. 1 viewing another angle.

Referring to FIG. 2 further, the film 6 to be pasted can be placed in the accommodating space of the screen protector film paste tool 100, and both sides of the film 6 to be pasted can be clamped on the deformable pressing member 3. Specifically, the deformable pressing member 3 is in contact with one side edge of the film 6 to be pasted, and another side edge of the film 6 to be pasted is in contact with the deformable pressing member 3 on another side frame of the frame body 1. When the deformable pressing members 3 on the left and right sides are simultaneously pressed down, the inner sides of the deformable pressing members 3 on both sides move inward and are respectively in contact with the two side edges of the film 6 to be pasted, to the film 6 to be pasted in the accommodating space 2. Adopting a structure in which both side frames correspondingly provide a set of the deformable pressing members 3, when the deformable pressing members 3 on both sides are pressed, the inner sides of the deformable pressing members 3 on both sides respectively move inward and are respectively in contact with the two side edges of the film, to fix the film 6 to be pasted more firmly.

Referring to FIG. 2 again, the outer surface of the deformable pressing member 3 provides an anti-skid ridge 31, to prevent the film 6 to be pasted from accidentally falling off when clamping the film 6 to be pasted which will lead to inaccurate film application.

Figure 3:
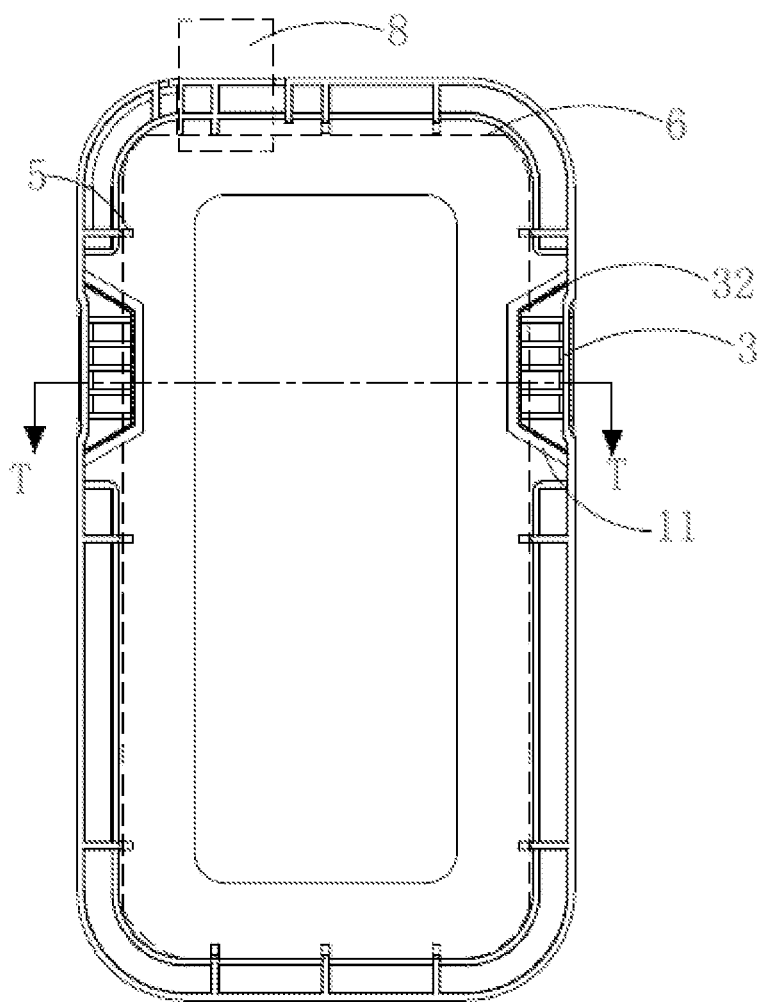
FIG. 3 is a schematic diagram of the screen protector film paste tool which has a film to be pasted.
Figure 4:
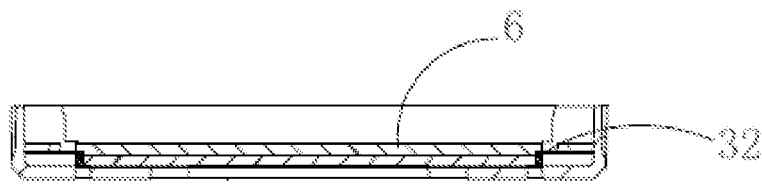
FIG. 4 is a cross-sectional view along T-T direction of the film to be pasted of FIG. 3.

Referring to FIG. 3 and FIG. 4, in other embodiments, one side of the film 6 to be pasted may be clamped on at least one deformable pressing member 3, and another side is in direct contact with the side frame. When the deformable pressing member 3 is pressed down, a side provided with the deformable pressing member 3 moves a certain distance to a side frame without the deformable pressing member 3, to fix the film 6 to be pasted in the accommodating space 2. To further improve the firmness of the film 6 to be pasted in the accommodating space 2, therefore, an anti-skid layer 32 can also be provided at the position where the side frame is in contact with the film 6 to be pasted, to improve the skid resistance.

Further, the anti-skid ridge 31 shown in FIG. 2 and the anti-skid layer 32 shown in FIG. 3 and FIG. 4 can be made of silica gel, TPU, etc., which can also make the contact surface of the deformable pressing members 3 or the side frame and the film 6 to be pasted deform after being pressed while providing the skid resistance, to improve the stability of fixing the film 6 to be pasted.

Referring to FIG. 2 and FIG. 3 again, the inner side of the frame body 1 provides a lug 5, and the lug 5 is set according to the modelling of the electronic device 9, to fix and place the electronic device 9 to be pasted with the film in the accommodating space 2, and to precisely align with the film. The present invention is not only suitable for various models of smart phones, but also can be applied to various electronic products such as smart mobile terminals, tablet computers, game consoles, etc., and has advantages of low production cost, simple and accurate operation, etc.

Figure 5:
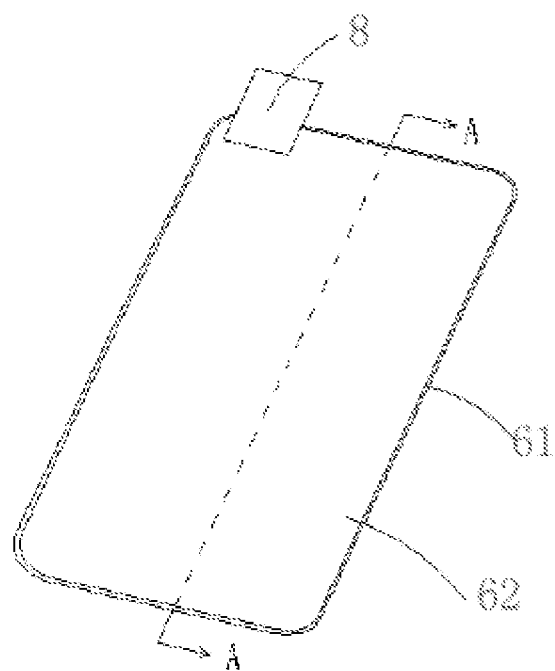
FIG. 5 is a schematic diagram of the film to be pasted.
Figure 6:
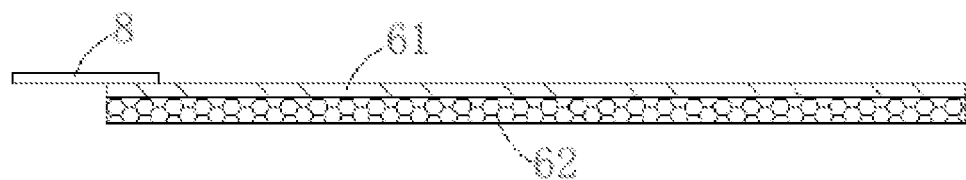
FIG. 6 is a cross-sectional view along A-A direction of the film to be pasted of FIG. 5.

Referring to FIG. 3, FIG. 5 and FIG. 6, the film 6 to be pasted can be placed in the accommodating space 2. Specifically, referring to FIG. 5 and FIG. 6, the film 6 to be pasted further includes a release film layer 61, a main body layer 62 and a protective film lifting part 8. Wherein the protective film lifting part 8 is adhesively connected to the release film layer 61, and the protective film lifting part 8 is provided on the top of the main body layer 62. When the release film layer 61 needs to be uncovered, the protective film lifting part 8 can be uncovered first, and then the release film layer 61 can be removed together.

Further, referring to FIG. 2 and FIG. 3, to facilitate the removal of the protective film lifting part 8, the frame body 1 provides a notch 4. When the film 6 to be pasted is fixed in the accommodating space 2, the protective film lifting part 8 adhesively connected to the surface of the film 6 to be pasted protrudes from the notch 4 to the outside of the frame body 1.

Figure 7:
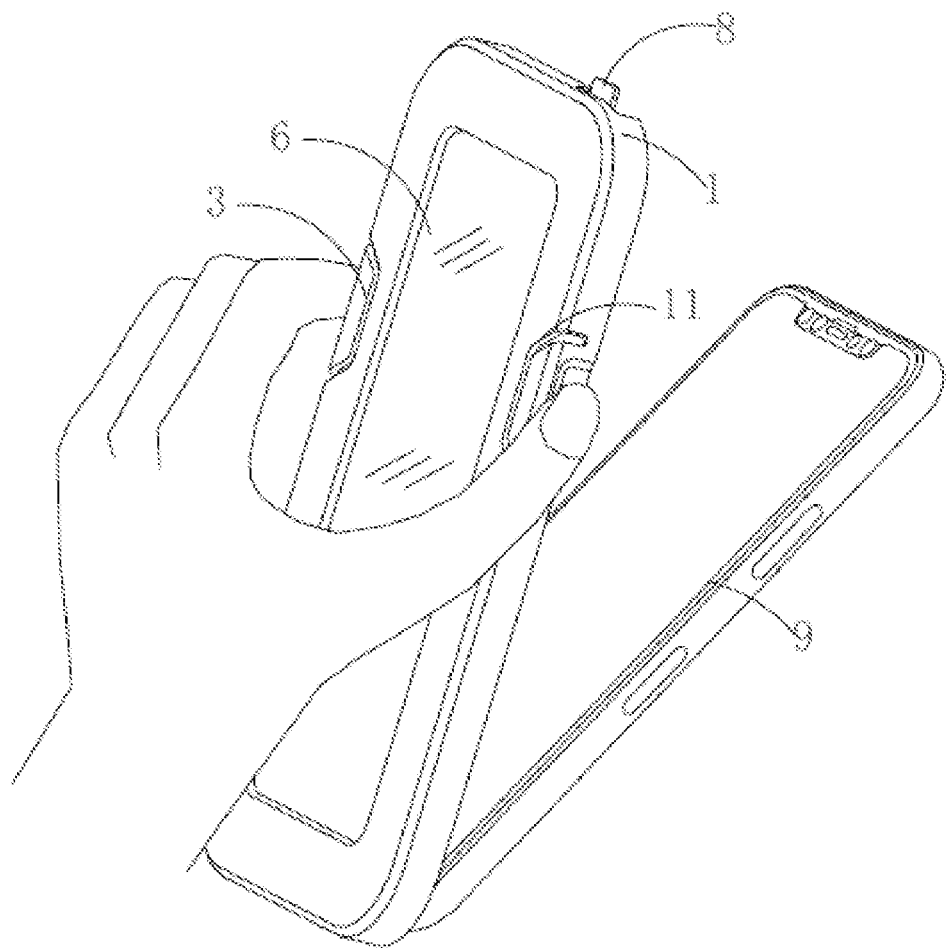
FIG. 7 shows a schematic diagram of installing the screen protector film paste tool fixed with the film to be pasted to an electronic device.

Referring to FIG. 7, when the present invention is in use, first placing the film 6 to be pasted in the accommodating space 2, the protective film lifting part 8 on the top of the film 6 to be pasted protrudes from the notch 4 to the outside of the frame body 1; pressing the deformable pressing member 3 to fix the film 6 to be pasted, tearing off the release film layer 61 on the surface of the main body layer 62 adhesively connected to the film 6 to be pasted through the protective film lifting part 8, and then buckling the frame body 1 and the main body layer 62 after tearing off the release film layer 61 to the surface of the electronic device 9 to be pasted with the film, releasing the deformable pressing members 3 on both sides to release the fixation of the screen protector film paste tool 100 to the film 6 to be pasted. In this case, the film 6 to be pasted falls by gravity and is attached to the surface of the electronic device 9. Since the accommodating space 2 inside the frame body 1 and the film 6 to be pasted completely correspond to the electronic device 9 to be pasted with the film, when the film 6 to be pasted is correctly placed and fixed on the electronic device 9 to be pasted with the film, and the frame body 1 is buckled on the surface of the electronic device 9, the position of the film and the screen of the electronic device 9 can maintain accurate alignment, and then the deformable pressing member 3 can be released to realize accurate film application, which is easy to operate, accurate and reliable.

The deformable pressing member 3 that achieves the technical effect of the present invention may have a variety of structural forms. In this embodiment, the deformable pressing member 3 can be disposed on both side frames of the frame body 1 and connected to the frame body 1 as a whole, and protrude toward the inner side of the frame body. The outer side of the deformable pressing member 3 is flush with the surface of the frame body 1, and the width of the inner side of the deformable pressing member 3 is greater than the width of the frame body 1 to extend into the accommodating space 2; when applying pressure to the outer side of the deformable pressing member 3, the inner side of the deformable pressing member 3 automatically resets to the outside. This embodiment structure has characteristics of integral molding, no secondary processing and production, low product cost, and simple operation.

Specifically, referring to FIG. 3 or FIG. 7, in this embodiment, the deformable pressing member 3 and the frame body 1 can be formed by injection molding and stamping. Wherein the deformable pressing member 3 is connected to the frame body and a gap 11 is provided therebetween, due to the disposition of the gap 11, the deformable pressing member 3 can be deformed to a certain extent when under pressure. The size of the gap 11 may be 0.1 mm-2 mm.

Figure 8:
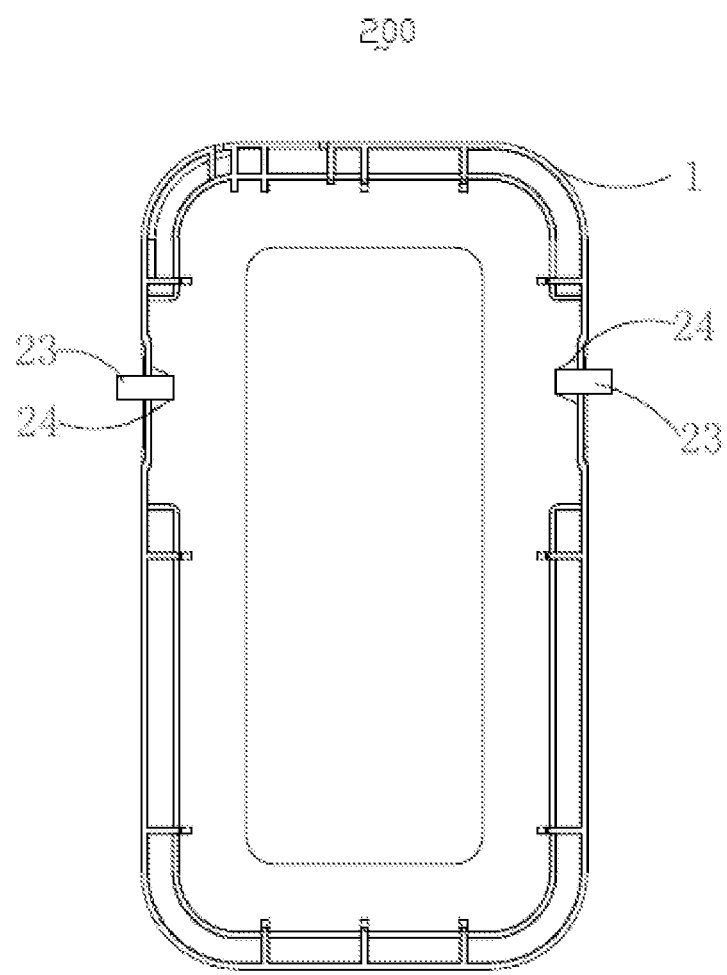
FIG. 8 is a plan view of a screen protector film paste tool according to a second embodiment of the present invention.

Referring to FIG. 8, a second embodiment of the present invention provides a screen protector film paste tool 200, and the differences between the screen protector film paste tool 200 and the screen protector film paste tool 100 in the first embodiment are as followings: the deformable pressing member 3 includes a pressing member 23 inserted to at least one side frame of the frame body 1, a supporting leg 24 connected between the inner end of the pressing member 23 and the inner side wall of the frame body 1; The outer end of the pressing member 23 protrudes from the side wall of the frame body 1, when applying pressure to the outer side of the pressing member 23, the inner side of the pressing member 23 moves toward the accommodating space 2 and compresses the supporting leg 24; when the pressure on the outer side of the pressing member 23 is removed, the pressing member 23 resets to the outside under the action of the supporting leg 24.

It may be understood that in this embodiment, the supporting leg 24 can perform a resetting function after being compressed and deformed under a force.

When in use, referring to FIG. 8, the deformable pressing member 3 is the pressing member 23 inserted to both side frames of the frame body 1, and is sleeved on the rod of the pressing member 23, and is located on a spring (not shown) between the inner end of the pressing member 23 and the inner side wall of the frame body 1. The outer end of the pressing member 23 protrudes from the side wall of the frame 1, when applying pressure to the outer side of the pressing member 23, the inner side of the pressing member 23 moves toward the accommodating space 2 and stretches the spring; when the pressure on the outer side of the pressing member 23 is removed, the pressing member resets to the outside under the action of the spring.

Figure 9:
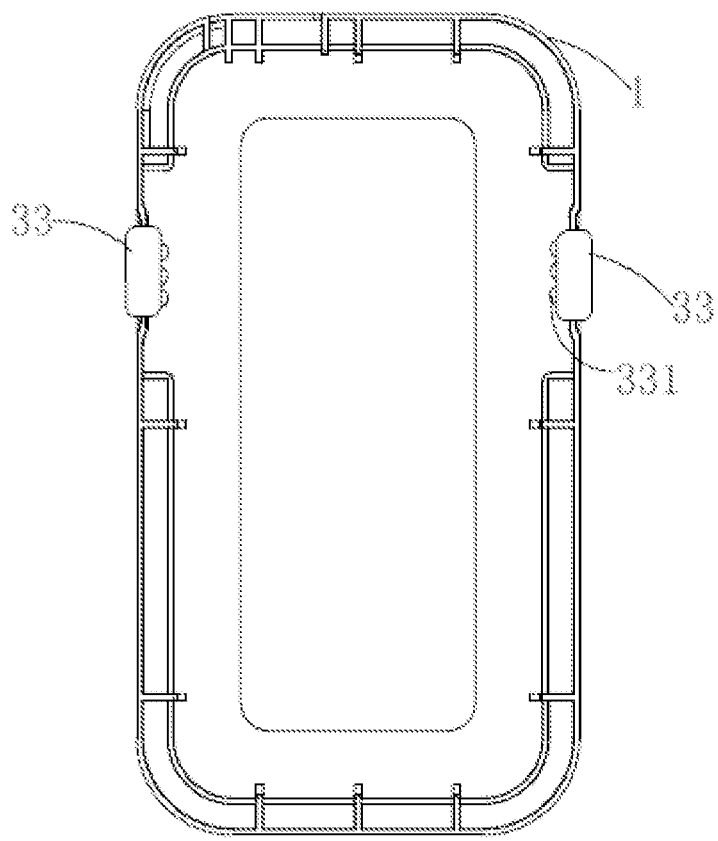
FIG. 9 is a plan view of the screen protector film paste tool according to a third embodiment of the present invention.

Referring to FIG. 9, a third embodiment of the present invention provides a screen protector film paste tool 300, and the main difference between the screen protector film paste tool 300 and the screen protector film paste tool 100 in the first embodiment, the screen protector film paste tool 200 in the second embodiment as well is as following: the deformable pressing member 3 includes a flexible block 33 embedded in at least one side frame of the frame body, and the flexible block 33 may be made of silica gel, TPU, rubber, etc. The flexible block 33 itself can be deformed, therefore, when in use, when the user applies a force to the flexible block 33, the flexible block 33 itself can be deformed to a certain extent; thereby, the flexible block 33 protrudes toward the inner wall, so that the inner wall of the flexible block 33 can be in closer contact with the film to be pasted (not shown).

Further, referring to FIG. 9 again, the inner wall of the flexible block 33 can also provide an anti-skid protrusion 331 to improve the grip of the flexible block 33 to the film to be pasted.

Further, since the materials of the flexible block 33 and the frame body 1 of the screen protector film paste tool 300 are different, the film to be pasted can be better protected, to avoid damage to the film to be pasted during the film application process.

Figure 10:
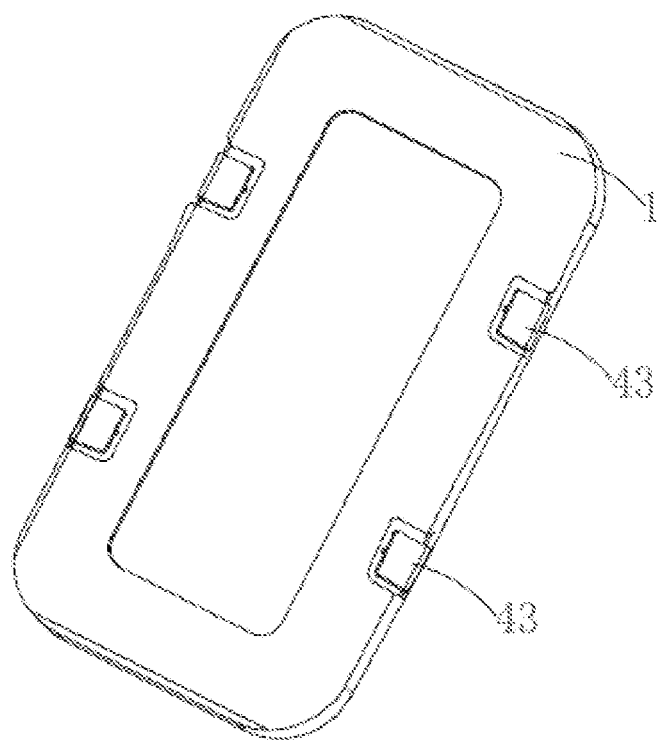
FIG. 10 is a perspective view of the screen protector film paste tool according to a fourth embodiment of the present invention.

Referring to FIG. 10, a fourth embodiment of the present invention provides a screen protector film paste tool 400, and compared with the screen protector film paste tools described in the above three embodiments, the screen protector film paste tool 400 has the following differences: the two side frames of the frame body 1 both provide two separate deformable pressing members 43, to better fix the film to be pasted.

Referring to FIG. 10 again, the deformable pressing members 43 are symmetrically disposed on the two side frames of the frame body 1.

It may be understood that to obtain a better fixed state, therefore, the deformable pressing members 43 may adopt different types of the deformable pressing members 43 as described in the first to third embodiments.

Figure 11:
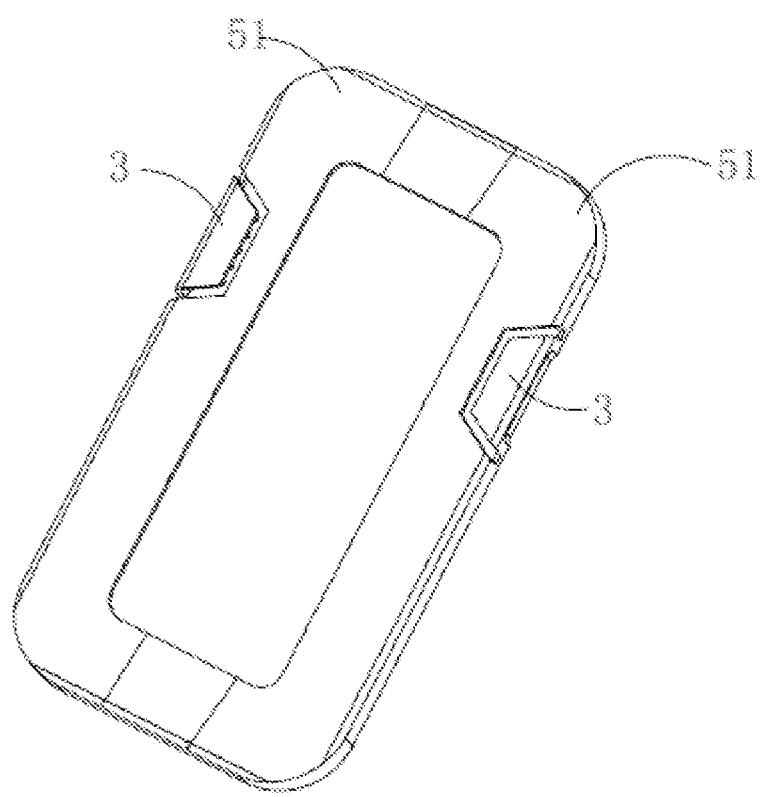
FIG. 11 is a perspective view of the screen protector film paste tool according to a fifth embodiment of the present invention.
Figure 12:
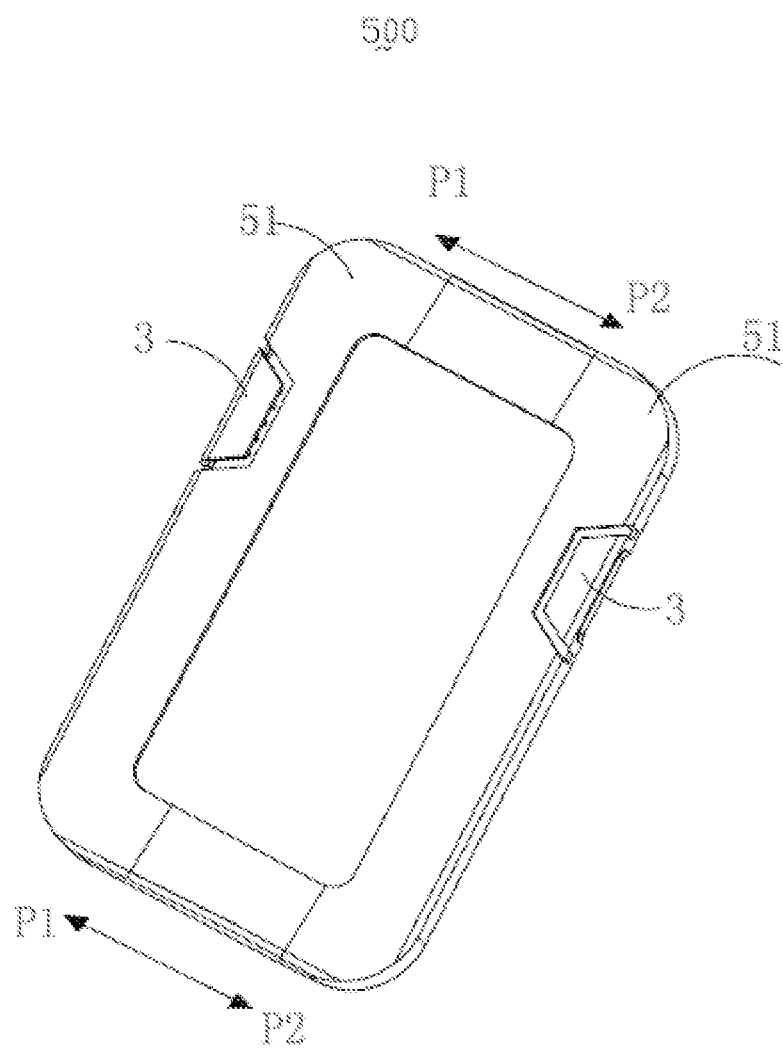
FIG. 12 is a schematic diagram of the screen protector film paste tool of FIG. 11 which adjusts the length along P1-P2 direction.

Referring to FIG. 11 and FIG. 12, a fifth embodiment of the present invention provides a screen protector film paste tool 500, and the main difference between the screen protector film paste tool 500 and the screen protector film paste tools described in the first to fourth embodiments is as following: the frame body 1 of the screen protector film paste tool 500 includes a plurality of side frames 51, and the shapes of the side frames 51 may be "I-shaped", "L-shaped", etc.

Figure 13:
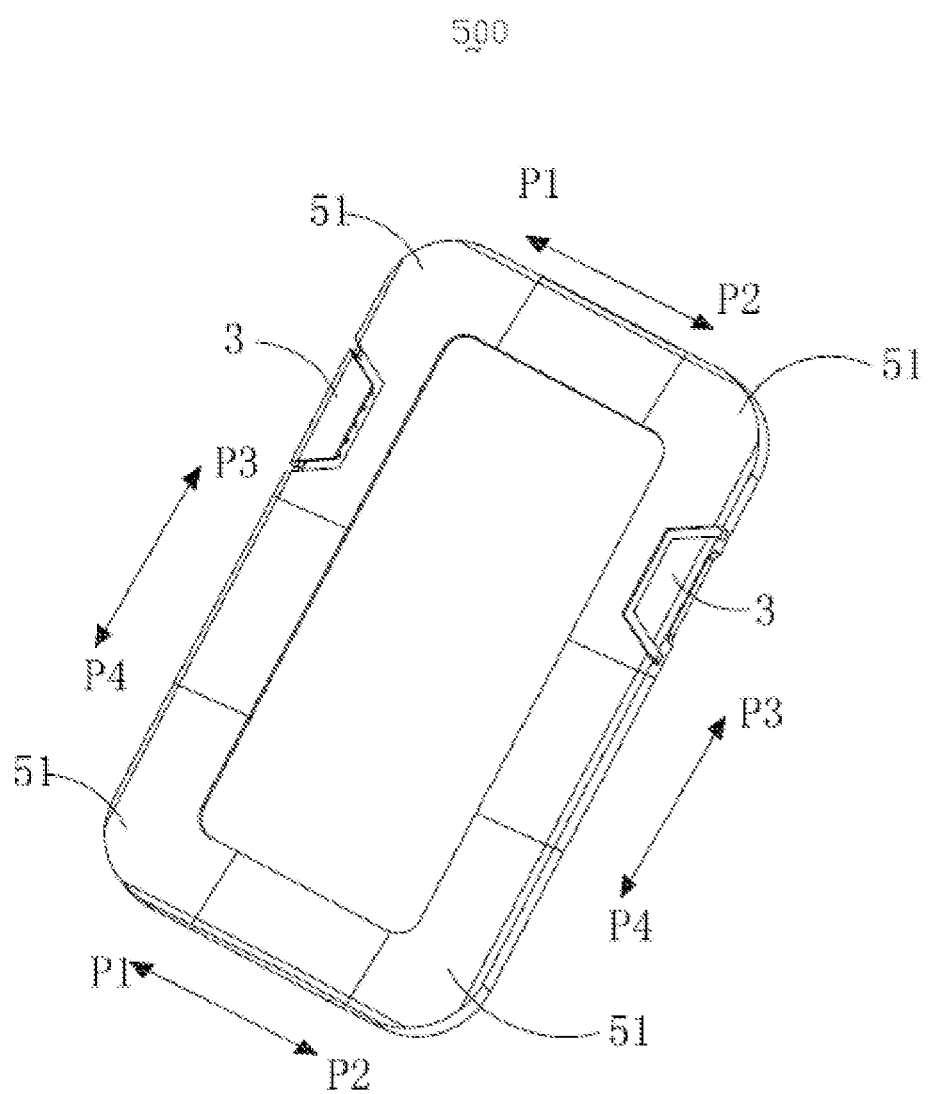
FIG. 13 is a schematic diagram of a screen protector film paste tool of FIG. 11 which adjusts the length respectively along P1-P2 direction and P3-P4 direction.

Referring to FIG. 12, the screen protector film paste tool 500 includes two side frames 51; referring to FIG. 13, the screen protector film paste tool 500 includes four side frames 51.

To enable the screen protector film paste tool 500 to meet demands for using different models of mobile phones the distance between a plurality of side frames 51 can be adjusted; specifically, the plurality of side frames 51 may be any one of elastically connected, sliding connected, engaged connected or fixedly connected, so that the specific distance of the side frames 51 can be adjusted based on actual demands. For example, when the side frames 51 are elastically connected, a spring structure can be provided between the adjacent side frames 51; when the side frames 51 are engaged connected, tooth clamping members can be respectively provided on the side frames 51, to realize the adjustment of the engaged connection between the two side frames 51.

Referring to FIG. 12 and FIG. 13, it may be understood that the plurality of side frames in the screen protector film paste tool 500 can respectively move along the direction P1 and the direction P2, the direction P3 and the direction P4, so as to realize the adjustment of the length and width of the screen protector film paste tool 500.

In the screen protector film paste tool 500 of the present invention, the specific distance adjustment demands can be selected based on actual demands, therefore, the screen protector film paste tool 500 can have better applicability.

Compared with the prior art, the screen protector film paste tool provided by the present invention has the following advantages:

The present invention provides a screen protector film paste tool for pasting a film to electronic devices. The screen protector film paste tool includes a frame body, an accommodating space defined by the frame body, and a deformable pressing member provided at least one side of the frame body, the inner side of the deformable pressing member is located in the accommodating space. When the deformable pressing member is pressed down, the inner side of the deformable pressing member moves into the accommodating space and comes into contact with one side of the film to be pasted, and another side of the film to be pasted is in contact with another side of the frame body or the deformable pressing member, so as to fix the film in the accommodating space. The screen protector film paste tool can facilitate the user to conveniently, quickly and accurately apply the film on the electronic device to be pasted with the film. By providing the deformable pressing member, the film to be pasted can be fixed in the accommodating space in the screen protector film paste tool by pressing with hands, and by operating with hands to facilitate that the film to be pasted can be precisely fitted to the electronic device to be pasted with the film by one-hand operation after the placement position is fixed.

Specifically, the frame body includes a plurality of side frames, wherein the two opposite side frames correspondingly provides at least a set of deformable pressing members. The deformable pressing members that meet the installation conditions can be set specifically based on actual demands, so as to meet various installation demands.

In the present invention, any one of the elastic connection, sliding connection or fixed connection is formed between a plurality of side frames, to meet demands for using different models of mobile phones and improve the effective utilization rate of the screen protector film paste tool.

The film to be pasted provides a detachable protective film lifting part, and the frame body provides a notch, when the film to be pasted is fixed in the accommodating space, the protective film lifting part bonded to the surface of the film to be pasted protrudes from the notch to the outside of the frame body, which can facilitate to tear off of the protective film lifting part, avoid touching the adhesive surface of the film to be pasted with hands, and improve the efficiency of the film application.

The deformable pressing member and the frame body are integrally formed, the outer side of the deformable pressing member is flush with the surface of the frame body, and the inner side protrudes from the frame body. When the deformable pressing member receives pressure applied to its outer side, the deformable pressing member deforms toward the accommodating space; when the external force is removed, the deformable pressing member automatically resets to the outside. Based on the design of this structure, the preparation technology of the screen protector film paste tool can be simplified, the product structure can be simplified, and the product can be conveniently used.

To satisfy that the film application of the screen protector film paste tool can be realized with a small pressing force, an end of the deformable pressing member is fixedly connected to the frame body, and a gap is formed between another end of the deformable pressing member and the frame body; based on the adjustment of the gap size, the demands for different pressing forces can be satisfied.

To satisfy the demands for a variety of different installation structures, the deformable pressing member includes a pressing member inserted to the two sides of the frame body, and the outer side of the pressing member protrudes from the side wall of the frame body. When applying force to the pressing member, the pressing member can move relative to the frame body. The movable pressing member can effectively avoid damage to the film to be pasted by the pressing member. That is, after placing the film to be pasted in the accommodating space, then pressing the pressing member against the edge of the film to be pasted, so as to avoid cracking the film to be pasted or damaging the edge due to improper operation during the placement process.

In the present invention, the supporting leg and the spring are set so that when the external force is removed, the supporting leg drives the pressing member to automatically reset to the outside, and restricts the movement track of the pressing member at the same time, so that the pressing member can operate more stably.

For some special embodiments, the deformable pressing member further includes a flexible block embedded in at least one side frame of the frame body, and the flexible block includes any one of silica gel, TPU, and rubber, to avoid damage to the film to be pasted by the deformable pressing member.

In the present invention, the inner side of the frame body provides a lug, and the lug is in contact with the electronic device to be pasted with the film, so as to better fix the screen protector film paste tool and the electronic device, and improve the accuracy of the film application.

The foregoing descriptions are merely preferred embodiments of the present invention, and are not intended to limit the present invention. Within the principles of the present invention, any modifications, equivalent substitutions, improvements, etc., are within the protection scope of the present invention.

The invention claimed is:

1. A screen protector film paste tool, for pasting a film to electronic devices, comprising a frame body, an accommodating space defined by the frame body, and a deformable pressing member provided on at least one side of the frame body, an inner side of the deformable pressing member being located in the accommodating space; when in use, the deformable pressing member is pressed down, the inner side of the deformable pressing member moves into the accommodating space and comes into contact with one side of the film to be pasted, and another side of the film to be pasted is in contact with another side of the frame body or the deformable pressing member, so as to fix the film in the accommodating space.

2. The screen protector film paste tool according to claim 1, wherein the frame body comprises a plurality of side frames, therein the two opposite side frames correspondingly provide at least a set of deformable pressing members.

3. The screen protector film paste tool according to claim 2, wherein the two opposite side frames separately provide one or two deformable pressing members.

4. The screen protector film paste tool according to claim 2, wherein any one of an elastic connection, a sliding connection or a fixed connection is formed between the plurality of side frames.

5. The screen protector film paste tool according to claim 1, wherein the film to be pasted provides a detachable protective film lifting part, and the frame body provides a notch, when the film to be pasted is fixed in the accommodating space, the protective film lifting part bonded to the surface of the film to be pasted protrudes from the notch to an outside of the frame body.

6. The screen protector film paste tool according to claim 1, wherein the deformable pressing member and the frame body are integrally formed, an outer side of the deformable pressing member is flush with a surface of the frame body, and the inner side protrudes from the frame body; when the deformable pressing member receives pressure applied to its outer side, the deformable pressing member deforms toward the accommodating space; when an external force is removed, the deformable pressing member automatically resets to an outside.

7. The screen protector film paste tool according to claim 6, wherein an end of the deformable pressing member is fixedly connected to the frame body, and a gap is formed between another end of the deformable pressing member and the frame body.

8. A screen protector film paste tool according to claim 1, wherein the deformable pressing member includes a pressing member inserted to the two sides of the frame body, and an outer side of the pressing member protrudes from a side wall of the frame body; when applying force to the pressing member, the pressing member can move relative to the frame body.

9. A screen protector film paste tool according to claim 8, wherein the deformable pressing member further includes a supporting leg connected between an inner end of the pressing member and an inner side wall of the frame body, when applying pressure to the outer side of the pressing member, the inner end of the pressing member moves toward the accommodating space and compresses the supporting leg; when an external force is removed, the supporting leg drives the pressing member to automatically reset to an outside.

10. A screen protector film paste tool according to claim 8, a spring is located between an inner side of the pressing member and an inner side wall of the frame body, when applying pressure to the outer side of the pressing member, the inner side of the pressing member moves toward the accommodating space and stretches the spring; when an external force is removed the spring drives the pressing member to automatically reset to an outside.

11. A screen protector film paste tool according to claim 1, wherein the deformable pressing member includes a flexible block embedded in at least one side frame of the frame body, and the flexible block includes any one of silica gel, TPU, and rubber.

12. A screen protector film paste tool according to claim 11, wherein a side facing the accommodating space of the flexible block provides an anti-skid protrusion.

13. The screen protector film paste tool according to claim 1, wherein an outer surface of the deformable pressing member provides an anti-skid ridge.

14. The screen protector film paste tool according to claim 1, wherein an inner side of the deformable pressing member provides an anti-skid layer.

15. The screen protector film paste tool according to claim 1, wherein an inner side of the frame body provides a lug, and the lug is in contact with the electronic device to be pasted with the film.

* * * * *